United States Patent
Pisklak et al.

(10) Patent No.: US 10,125,299 B2
(45) Date of Patent: Nov. 13, 2018

(54) METHODS OF USING LOST CIRCULATION TREATMENT MATERIALS COMPRISING BROWN MUD

(71) Applicant: Halliburton Energy Services, Inc., Houston, TX (US)

(72) Inventors: Thomas Jason Pisklak, Cypress, TX (US); Kyriacos Agapiou, Houston, TX (US); Darrell Chad Brenneis, Marlow, OK (US); James Robert Benkley, Duncan, OK (US); Jiten Chatterji, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/540,557

(22) PCT Filed: Jan. 30, 2015

(86) PCT No.: PCT/US2015/013940
§ 371 (c)(1),
(2) Date: Jun. 28, 2017

(87) PCT Pub. No.: WO2016/122651
PCT Pub. Date: Aug. 4, 2016

(65) Prior Publication Data
US 2017/0369758 A1 Dec. 28, 2017

(51) Int. Cl.
*E21B 33/138* (2006.01)
*C09K 8/487* (2006.01)
(Continued)

(52) U.S. Cl.
CPC .......... *C09K 8/032* (2013.01); *C04B 18/0409* (2013.01); *C04B 28/02* (2013.01); *C04B 28/04* (2013.01); *C09K 8/02* (2013.01); *C09K 8/40* (2013.01); *C09K 8/42* (2013.01); *C09K 8/467* (2013.01); *C09K 8/501* (2013.01); *C09K 8/502* (2013.01); *C09K 8/601* (2013.01); *C09K 8/64* (2013.01); *E21B 21/003* (2013.01); *E21B 33/138* (2013.01); *C04B 2103/46* (2013.01); *Y02W 30/91* (2015.05)

(58) Field of Classification Search
CPC ...... E21B 21/003; E21B 33/138; C09K 8/487
See application file for complete search history.

(56) References Cited

U.S. PATENT DOCUMENTS 2,894,906 A  7/1959  Sheeler
3,086,938 A  4/1963  Means et al.
(Continued)

OTHER PUBLICATIONS

International Search Report and Written Opinion PCT/US2015/013940 dated Oct. 7, 2015.
Australian Examination Report for Application No. 2015380502 dated May 31, 2018.

*Primary Examiner* — Catherine Loikith
(74) *Attorney, Agent, or Firm* — Craig W. Roddy; Tumey L.L.P.

(57) ABSTRACT

Providing a treatment fluid comprising a base fluid and a lost circulation material comprising brown mud. The treatment fluid is introduced into a wellbore within the subterranean formation such that at least a portion of the brown mud bridges openings in the subterranean formation to reduce loss of fluid circulation into the subterranean formation.

17 Claims, 7 Drawing Sheets

(51) Int. Cl.
  *C09K 8/03* (2006.01)
  *C09K 8/02* (2006.01)
  *E21B 21/00* (2006.01)
  *C09K 8/42* (2006.01)
  *C09K 8/467* (2006.01)
  *C09K 8/50* (2006.01)
  *C09K 8/502* (2006.01)
  *C09K 8/60* (2006.01)
  *C09K 8/64* (2006.01)
  *C04B 28/02* (2006.01)
  *C04B 18/04* (2006.01)
  *C04B 28/04* (2006.01)
  *C09K 8/40* (2006.01)
  *C04B 103/46* (2006.01)

(56) References Cited

U.S. PATENT DOCUMENTS

| | | | |
|---|---|---|---|
| 3,622,513 A * | 11/1971 | Miller | C09K 8/32 208/6 |
| 4,460,052 A | 7/1984 | Gockel | |
| 4,836,940 A | 7/1989 | Alexander | |
| 6,153,562 A | 11/2000 | Villar et al. | |
| 8,672,058 B2 | 3/2014 | Tommie, Jr. | |
| 2004/0040912 A1 | 3/2004 | McConchie et al. | |
| 2004/0112646 A1* | 6/2004 | Vail, III | E21B 4/04 175/65 |
| 2010/0000444 A1* | 1/2010 | Constantz | B01D 53/1425 106/465 |
| 2010/0113251 A1 | 5/2010 | San-Miguel et al. | |
| 2011/0011557 A1 | 1/2011 | Shelton | |
| 2014/0102944 A1* | 4/2014 | Bauer | C10G 47/02 208/112 |

* cited by examiner

METHODS OF USING LOST CIRCULATION TREATMENT MATERIALS COMPRISING BROWN MUD

BACKGROUND

The disclosed examples relate to servicing a wellbore and, in particular, to the introduction of brown mud lost circulation materials into a wellbore to reduce the loss of fluid into a subterranean formation.

A natural resource such as oil or gas residing in a subterranean formation can be recovered by drilling a well bore into the formation. A wellbore is typically drilled while circulating a drilling fluid through the wellbore. Among other things, the circulating drilling fluid may lubricate the drill bit, carry drill cuttings to the surface, and balance the formation pressure exerted on the well bore. One problem associated with drilling may be the undesirable loss of drilling fluid to the formation. Such lost fluids typically may go into, for example, fractures induced by excessive mud pressures, into pre-existing open fractures, or into large openings with structural strength in the formation. This problem may be referred to as "lost circulation," and the sections of the formation into which the drilling fluid may be lost may be referred to as "lost circulation zones." The loss of drilling fluid into the formation is undesirable, inter alia, because of the expense associated with the drilling fluid lost into the formation, loss of time, additional casing strings and, in extreme conditions, well abandonment. In addition to drilling fluids, problems with lost circulation may also be encountered with other fluids, for example, spacer fluids, completion fluids (e.g., completion brines), fracturing fluids, and cement compositions that may be introduced into a well bore.

One method that has been developed to control lost circulation involves the placement of lost circulation materials into the lost circulation zone. Conventional lost circulation materials may include fibrous, lamellated, or granular materials. The lost circulation materials may be placed into the formation, inter alia, as a separate lost circulation pill in an attempt to control and/or prevent lost circulation. For a number of reasons, use of lost circulation materials may not provide a desirable level of lost circulation control in all circumstances.

Lost circulation materials may be incorporated into a treatment fluid, and upon encountering a lost circulation zone or more generally, a fracture or void, the lost circulation materials may bridge the zone, fracture, void, etc. to stop fluid loss. The choice of a lost circulation material may be based on the magnitude of fluid loss, size and shape of the lost circulation material, and cost of the lost circulation material.

BRIEF DESCRIPTION OF THE DRAWINGS

These drawings illustrate certain aspects of some of the embodiments of the present invention, and should not be used to limit or define the invention.

DESCRIPTION OF SPECIFIC EMBODIMENTS

Figure 1:
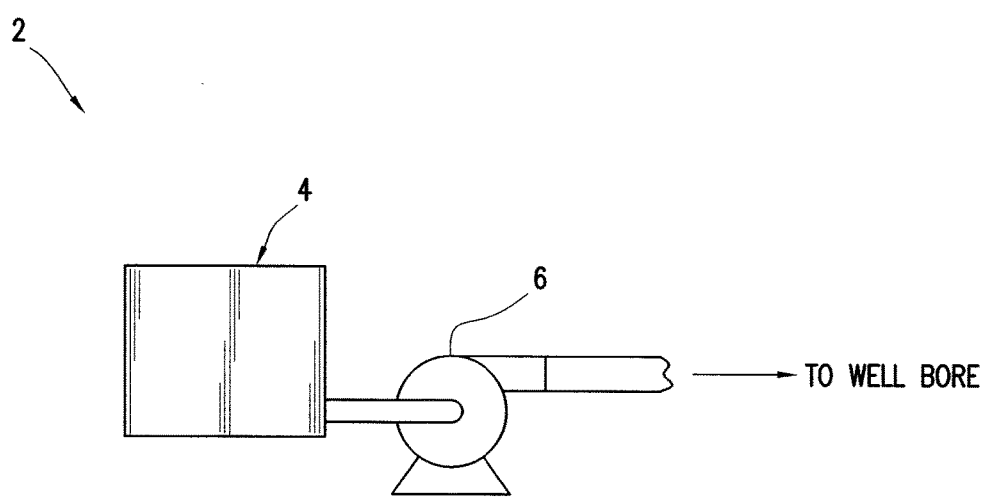
FIG. 1 illustrates a system for the preparation and delivery of a treatment fluid into a wellbore in accordance with certain embodiments.

The disclosed examples relate to servicing a wellbore and, in particular, to the introduction of brown mud lost circulation materials into a wellbore to reduce the loss of fluid into a subterranean formation. There may be several potential advantages to the disclosed methods and compositions, only some of which may be alluded to herein. One of the many potential advantages to these methods and compositions is that they may plug off or bridge fractures, voids, lost circulation zones, etc. by blocking both small and large fractures. Another advantage is that the lost circulation materials are a waste product and thus, easy and inexpensive to obtain. A further advantage is that use of brown mud as a lost circulation material may help dispose of brown mud and provide an industrial use for the waste product.

The alumina refining industry sinters bauxite ore and in so doing, produces sintered bauxite waste. The sintered bauxite waste may be referred to as "brown mud" or "brown lime." Brown mud is produced by sintering bauxite ore with sodium carbonate and then isolated after an aqueous leaching cycle. Brown mud is difficult to dispose of and has no recognized industrial use. Brown mud is typically stored in large holding tanks until it can be disposed. However, there is a danger in long term open pit storage as brown mud may by highly alkaline and caustic to anything it contacts.

Generally, the treatment fluids disclosed herein may comprise a lost circulation material and a base fluid. The lost circulation material may comprise a brown mud. The brown mud may be obtained from the sintering of bauxite ore in the presence of sodium carbonate followed by an aqueous leaching cycle. The resulting product may then undergo a solid/liquid phase separation to isolate the brown mud, after which it is removed. The brown mud may be used in a variety of treatment fluids. The treatment fluid may be a fluid used solely to convey the lost circulation materials or it may be a treatment fluid used for servicing a wellbore, for example, a cement, drilling fluid, spacer fluid, spotting fluid, etc. The brown mud may be mixed with other types of lost circulation materials. The brown mud is not settable like some types of lost-circulation materials, and may resist setting up to temperatures as high as 140° F. The brown mud is an inorganic material and may prevent the spread of bacteria which may consume organic types of lost circulation materials such as seed and nut shells. The brown mud should be inert and may be used in drilling fluids, spacer fluids, cement slurries, etc. without interfering with the functionality of those fluids. The brown mud may have a broad particle size distribution which may enable it to bridge both large and small fractures. Thus, the brown mud lost circulation material may be used in applications where bridging of lost circulation zones is desired. With the benefit of this disclosure, one having ordinary skill in the art should recognize the applications suitable for a brown mud lost circulation material.

The brown mud may be provided in any suitable form, including as dry solids or in a liquid form, which may comprise brown mud solids and an aqueous or nonaqueous based fluid. The base fluid content of the brown mud may be as high as 25% by weight of the brown mud or potentially even higher. If desired, the brown mud may be dried to reduce its fluid content prior to use. Natural or mechanical means may be used for drying the brown mud. By way of example, the brown mud may be air dried or drum dried. The brown mud may be added to a treatment fluid as either dry solids, liquid, or a mixture of both.

While the chemical analysis of brown mud will typically vary from various manufacturers depending on a number of factors, including the particular solid material feed, process conditions, treatments, and the like, brown mud typically may comprise a mixture of solid and metallic oxide-bearing minerals. By way of example, the brown mud may comprise a number of different oxides (based on oxide analysis), including, without limitation, $Na_2O$, $MgO$, $Al_2O_3$, $SiO_2$, $CaO$, and/or $Fe_2O_3$. Moreover, the brown mud generally may comprise a number of different crystal structures, including, without limitation, calcite ($CaCO_3$), quartz ($SiO_2$), katoite ($Ca_3Al_2(SiO_4)_{3-x}(OH)_{4x}$ where x=1.5-3), kaolinite ($Al_2Si_2O_5(OH)_4$), perovskite ($CaTiO_3$), etc. The majority of brown mud may be calcite and katoite with very little quartz, etc. The composition of brown mud is discussed further in Example 1 below.

The brown mud may be included in the treatment fluid in a crushed, ground, powder, particulate, liquid, or any other suitable form. The brown mud may comprise particles with a particle size in a range of less than 1 μm to over 1000 μm. The median particle size of brown mud may be between 1 μm and 200 μm. For example, a d50 particle size distribution of from about 1 μm to about 200 μm and, alternatively, from about 10 μm to about 50 μm. By way of further example, the brown mud solids may have a d50 particle size distribution ranging between any of and/or including any of about 1 μm, about 5 μm, about 10 μm, about 20 μm, about 30 μm, about 40 μm, about 50 μm, about 60 μm, about 70 μm, about 80 μm, about 90 μm, about 100 μm, about 150 μm, or about 200 μm. Further the brown mud may comprise particles with particle diameters less than 3 μm. In some examples, the brown mud may have a multi-modal particle size distribution. By way of example, the brown mud may have 2, 3, 4, 5, 6, or more modal peaks. Modal peaks occur on a particle size distribution curve when there are increased particle concentrations relative to particle sizes on either side of the curve. The particles size distribution of brown mud is discussed in more detail below in Example 2. One of ordinary skill in the art, with the benefit of this disclosure, should be able to select an appropriate particle size for the brown mud solids for a particular application.

The brown mud as well as any additional lost circulation materials, may be dispersed in a treatment fluid to provide mitigation of potential lost circulation of the treatment fluid. The treatment fluid may be used solely for conveying the lost circulation materials or may be any such treatment fluid used for servicing a wellbore, for example, a cement, drilling fluid, spacer fluid, etc. By way of example, the brown mud may be present in the treatment fluid in an amount in the range of from about 0.1% to about 50% by weight of the treatment fluid and, alternatively, the brown mud may be present in the treatment fluid in an amount of about 1% to about 40% by weight of the treatment fluid, alternatively, the brown mud may be present in the treatment fluid in an amount of about 1% to about 20% by weight of the treatment fluid, or further alternatively, the brown mud may be present in the treatment fluid in an amount of about 1% to about 10% by weight of the treatment fluid. The treatment fluid may comprise an aqueous-based fluid, for example, fresh water, water containing one or more salts dissolved therein, seawater, brines, saturated saltwater, etc. Alternatively, the treatment fluid may comprise a non-aqueous based fluid. Examples of non-aqueous based fluids may include petroleum oil, natural oil, synthetically derived oil, mineral oil, silicone oil, kerosene oil, diesel oil, an alpha olefin, an internal olefin, an ester, a diester of carbonic acid, a paraffin, or combinations thereof. In general, the base fluid may be present in an amount sufficient to form a pumpable fluid.

Some examples of the treatment fluids may comprise a cement and be used in cementing applications. Any of a variety of cements suitable for use in subterranean cementing operations may be used in accordance with embodiments of the present invention. Suitable examples include hydraulic cements that comprise calcium, aluminum, silicon, oxygen and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement, including Portland cements classified as Classes A, C, G and H cements according to American Petroleum Institute, *API Specification for Materials and Testing for Well Cements*, API Specification 10, Fifth Edition, Jul. 1, 1990. In addition, Portland cements suitable for use in embodiments the present invention may also include those classified as ASTM Type I, II, III, IV, or V.

The treatment fluids may be used for primary and/or remedial cementing applications. In these applications, the brown mud lost circulation material may reduce the loss of the cement composition including any base or carrier fluid into the formation. For example, a treatment fluid comprising a cement composition may be introduced into an annular space between a conduit located in a wellbore and the walls of a wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also, for example, support the conduit in the wellbore. The brown mud may prevent the loss of water into the formation, which may thus allow sufficient hydration of the cement so that the cement composition may set to form the annular sheath, etc.

In remedial cementing embodiments, a cement composition may be used, for example, in squeeze-cementing operations or in the placement of cement plugs. By way of example, the cement composition may be placed in a wellbore to plug an opening (e.g., a void or crack) in the formation, in a gravel pack, in the conduit, in the cement sheath, and/or between the cement sheath and the conduit (e.g., a microannulus).

Some examples of the treatment fluids may comprise a drilling fluid and be used in drilling fluid applications. Drilling requires the use of drilling fluid or as it is also known, drilling mud. Drilling fluids may be used to maintain hydrostatic pressure in the wellbore, prevent formation damage, suspend cuttings, and to transport cuttings to the surface. Drilling fluids may be water-based, oil-based, or emulsions of oil and water. Drilling fluids may comprise various additives such as emulsifiers, viscosifiers, density modifiers, etc. Typical water-based drilling fluids may be composed of solely water or a mixture of water and various types of clay. Oil based drilling fluids, also known as oil-based muds (OBM), typically use a base fluid of a petroleum product or other such fluid which is not miscible with water. In an oil-based drilling fluid, the oil or more generally, the fluid that is non-miscible with the aqueous fluid, is the continuous phase and water, brine, or other type of aqueous fluid is the internal phase.

In drilling fluid applications, the drilling fluid may be continuously circulated from the surface down to the bottom of the wellbore being drilled and back to the surface again. The drilling fluid serves several functions, one of them being to transport wellbore cuttings up to the surface where they are separated from the drilling fluid. Another function of the drilling fluid is to provide hydrostatic pressure on the walls of the drilled wellbore so as to prevent wellbore collapse and the resulting influx of gas or liquid from the formations being drilled.

The brown mud lost circulation materials described herein may also be used in any other type of treatment fluid requiring lost circulation mitigation. Examples of such treatment fluids may include, but is not limited to, spacer fluids, packer fluid, spotting fluids, etc. With the benefit of this disclosure, one of ordinary skill in the art will be able to use the brown mud lost circulation materials in a desired treatment fluid and application.

Lost circulation materials in addition to the above described brown mud may be included in the treatment fluids to, for example, help prevent the loss of fluid circulation into the subterranean formation. Examples of additional lost-circulation materials that may be used include, but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls. The additional lost circulation material or materials may be blended with the brown mud prior to combination of the blend with the base fluid to form the treatment fluid or the additional lost circulation material or materials may be added separately from the brown mud to the treatment fluid. The additional lost circulation materials may be present in the treatment fluid in an amount in the range of from about 0.1% to about 50% by weight of the treatment fluid and, alternatively, and, alternatively, the additional lost circulation materials may be present in the treatment fluid in an amount of about 1% to about 40% by weight of the treatment fluid, alternatively, the additional lost circulation materials may be present in the treatment fluid in an amount of about 1% to about 20% by weight of the treatment fluid, or further alternatively, the additional lost circulation materials may be present in the treatment fluid in an amount of about 1% to about 10% by weight of the treatment fluid.

In some embodiments, the treatment fluids may further comprise a viscosifier to, for example, aid in suspending any of the lost circulation materials in the treatment fluids. Suitable viscosifying agents may include, but are not limited to, colloidal agents (e.g., clays such as bentonite, polymers, and guar gum), emulsion-forming agents, diatomaceous earth, biopolymers, synthetic polymers, chitosans, starches, gelatins, or mixtures thereof. The clay may include a colloidal clay, nano clay, a synthetic clay, or a combination thereof. An example of a suitable synthetic clay is Thermavis™ additive, available from Halliburton Energy Services, Inc. The viscosifier may be present in the treatment fluids in an amount of about 0.1% to about 2% by weight of the treatment fluids. For example, the viscosifier may be present in an amount of about 0.1%, about 0.5%, about 1%, or about 2% by weight of the treatment fluids. One of ordinary skill in the art, with the benefit of this disclosure, should recognize the appropriate amount of viscosifier to include for a chosen application.

Other additives suitable for use in the treatment fluids may be used to enhance various properties of the treatment fluids. Examples of such additives include, but are not limited to weighting agents, lightweight additives, dispersants, fluid loss control additives, thixotropic additives, and combinations thereof. A person having ordinary skill in the art, with the benefit of this disclosure, should be able to determine the type and amount of additive useful for a particular application and desired result.

Weighting agents are typically materials that weigh more than water and may be used to increase the density of the treatment fluids. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Lightweight additives may be included in the treatment fluids to, for example, decrease the density of the treatment fluids. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Dispersants may be included in the treatment fluids to, for example, disperse the lost circulation materials in the base fluid of the treatment fluids. Examples of suitable dispersants may include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Additionally, polyoxyethylene phosphonates and polyox polycarboxylates may be used. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc., Houston, Tex. The Liquiment® 514L dispersant may comprise 36% by weight of the polycarboxylated ether in water. One of ordinary skill in the art, with the benefit of this disclosure, should recognize the appropriate type of dispersant to include for a chosen application.

Thixotropic additives may be included in the treatment fluids to, for example, provide a treatment fluid that may be pumpable as a thin or low viscosity fluid, but when allowed to remain quiescent attains a relatively high viscosity. Among other things, thixotropic additives may be used to help control free water, create rapid gelation as the composition sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

Those of ordinary skill in the art should appreciate that the treatment fluids generally should have a density suitable for a particular application. By way of example, the treatment fluids may have a density in the range of from about 4 pounds per gallon ("ppg") to about 25 ppg. In certain embodiments, the treatment fluids may have a density in the range of from about 4 ppg to about 17 ppg, alternatively, about 8 ppg to about 12 ppg, and further alternatively, about 9 ppg to about 11 ppg. Those of ordinary skill in the art, with the benefit of this disclosure, should recognize the appropriate density for a particular application.

As will be appreciated by those of ordinary skill in the art, the brown mud may be used to control lost circulation. As previously mentioned, lost circulation zones, fractures, voids, etc. are often encountered into which drilling fluid (or other well treatment fluid) circulation can be lost. As a result, drilling typically must be terminated with the implementation of remedial procedures. The brown mud may be used to bridge any of the lost circulation zones, fractures, voids, etc. to prevent the uncontrolled flow of fluids into or out of the lost circulation zones, e.g., lost drilling fluid circulation, crossflows, underground blow-outs and the like. In an example, a treatment fluid comprising the brown mud may be prepared. After preparation, the treatment fluid may be introduced into a wellbore comprising a fracture or other openings in which fluid circulation may be lost. The treatment fluid may be pumped through one or more openings at the end of a drill pipe or any other piping or tubing. Once placed into the wellbore, the brown mud in the treatment fluid may bridge the fracture or other openings. This process may control the loss of subsequently pumped treatment fluids, allowing for continued applications, for example, drilling. The treatment fluids disclosed herein may be used to control lost circulation problems encountered with any fluids that may be placed into the wellbore, for example, drilling fluids, cements, spacer fluids, completion fluids (e.g., completion brines), fracturing fluids, and the like.

A method for reducing lost circulation in a subterranean formation may be provided. The method may include one or all of the components illustrated on FIGS. 1-6. The method may comprise providing a treatment fluid comprising a base fluid and a lost circulation material comprising brown mud; introducing the treatment fluid into a wellbore within the subterranean formation such that at least a portion of the brown mud bridges openings in the subterranean formation to reduce loss of fluid circulation into the subterranean formation. The brown mud may be derived from bauxite ore sintering in the presence of sodium carbonate. The brown mud may comprise at least 50% calcite and at least 30% katoite. The brown mud may have a median particle size between about 20 µm and about 100 µm. The brown mud may comprise particles with a particle diameter of less than 3 µm. The treatment fluid may comprise a drilling fluid, a spacer fluid, a spotting fluid, a packer fluid, a cement composition, a completion fluid, or a fracturing fluid. The treatment fluid may comprise a drilling fluid wherein the drilling fluid circulates drill cuttings to the surface of the wellbore. The treatment fluid may comprise a cement composition wherein the cement composition is allowed to set in the wellbore. The brown mud may be placed into a lost circulation zone disposed within the subterranean formation. The base fluid may be an aqueous fluid. The base fluid may be a non-aqueous selected from the group consisting of petroleum oil, natural oil, synthetically derived oil, mineral oil, silicone oil, kerosene oil, diesel oil, an alpha olefin, an internal olefin, an ester, a diester of carbonic acid, a paraffin, and combinations thereof.

A treatment fluid may be provided. The treatment fluid may include one or all of the components illustrated on FIGS. 1-6. The treatment fluid may comprise a lost circulation material comprising brown mud, and a base fluid. The brown mud may be derived from bauxite ore sintering in the presence of sodium carbonate. The brown mud may comprise at least 50% calcite and at least 30% katoite. The brown mud may have a median particle size between about 20 µm and about 100 µm. The brown mud may comprise particles with a particle diameter of less than 3 µm. The treatment fluid may comprise a drilling fluid, a spacer fluid, a spotting fluid, a packer fluid, a cement composition, a completion fluid, or a fracturing fluid. The base fluid may be an aqueous fluid. The base fluid may be a non-aqueous fluid selected from the group consisting of petroleum oil, natural oil, synthetically derived oil, mineral oil, silicone oil, kerosene oil, diesel oil, an alpha olefin, an internal olefin, an ester, a diester of carbonic acid, a paraffin, and combinations thereof.

A system for bridging a lost circulation zone may be provided. The system may include one or all of the components illustrated on FIGS. 1-6. The system may comprise a treatment fluid comprising a lost circulation material comprising brown mud and a carrier fluid; a fluid handling system comprising the treatment fluid; and a conduit at least partially disposed within the wellbore and fluidically coupled to the fluid handling system. The brown mud may be derived from bauxite ore sintering in the presence of sodium carbonate. The brown mud may comprise at least 50% calcite and at least 30% katoite. The brown mud may have a median particle size between about 20 µm and about 100 µm. The brown mud may comprise particles with a particle diameter of less than 3 µm. The treatment fluid may comprise a drilling fluid, a spacer fluid, a spotting fluid, a packer fluid, a cement composition, a completion fluid, or a fracturing fluid. The base fluid may be an aqueous fluid. The base fluid may be a non-aqueous fluid selected from the group consisting of petroleum oil, natural oil, synthetically derived oil, mineral oil, silicone oil, kerosene oil, diesel oil, an alpha olefin, an internal olefin, an ester, a diester of carbonic acid, a paraffin, and combinations thereof.

With reference to FIG. 1, a fluid handling system 2 is illustrated that may be used in placement of a treatment fluid or particular portion thereof into a wellbore in accordance with some of the examples described herein. As shown, the treatment fluid (or a portion thereof) may be mixed in vessel 4, such as a hopper, jet mixer, re-circulating mixer, or a batch mixer, for example, and then pumped via pumping equipment 6 to the wellbore. In some embodiments, the vessel 4 and the pumping equipment 6 may be disposed on one or more cement trucks as should be apparent to those of ordinary skill in the art. While not shown separately, in embodiments, the vessel 4 may comprise one or more of a circulating pump, a liquid additive system, an additive tank, and/or a storage tank.

Figure 2:
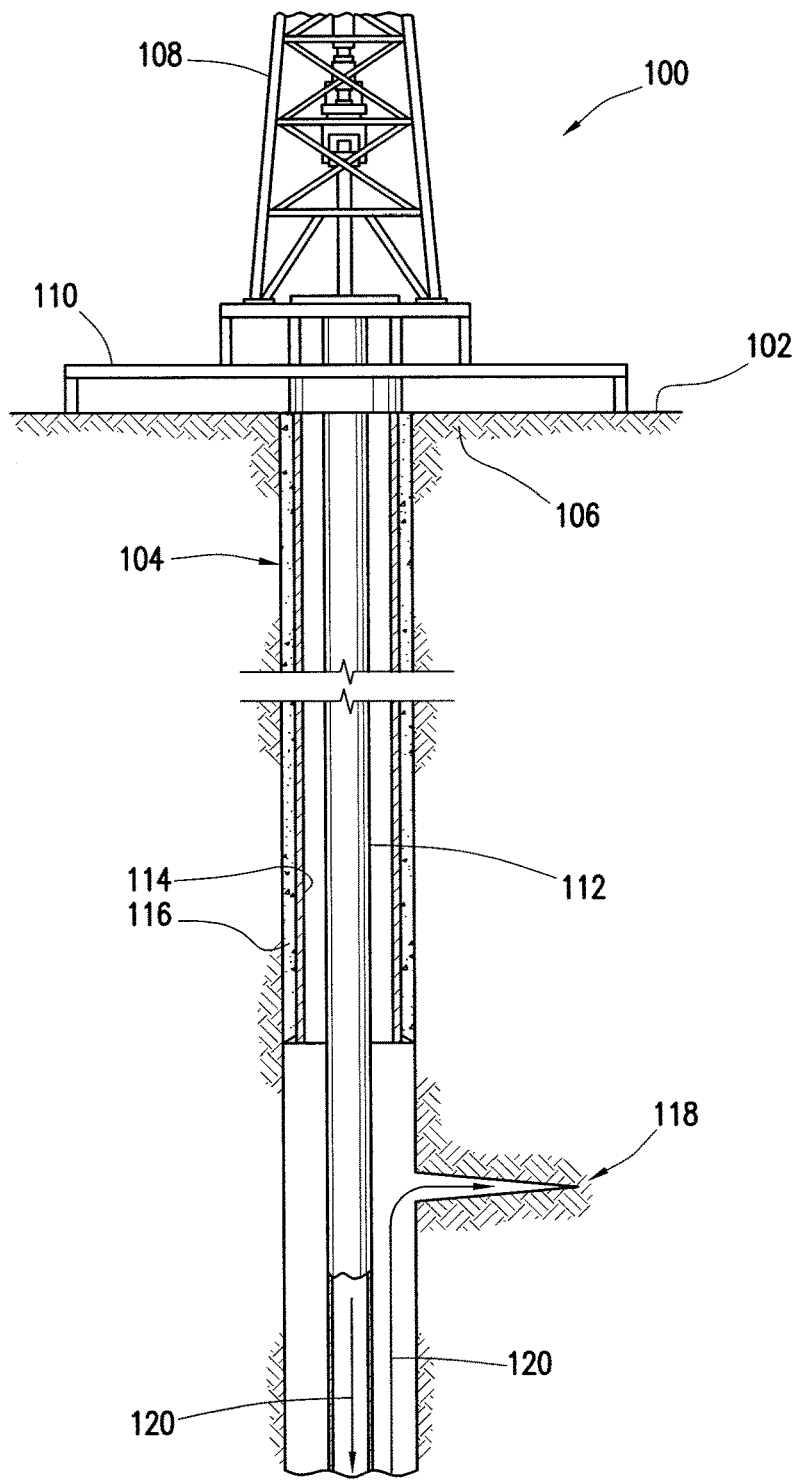
FIG. 2 illustrates an embodiment of the introduction of a treatment fluid into a lost circulation zone within a wellbore penetrating a subterranean formation.

Turning now to FIG. 2, an example operating environment for the methods and compositions described herein is shown. It should be noted that while FIG. 1 generally depicts a land-based operation, those skilled in the art should readily recognize that the principles described herein are equally applicable to subsea operations that employ floating or sea-based platforms and rigs, without departing from the scope of the disclosure. As illustrated, a drilling rig 100 may be positioned on the Earth's surface 102 extending over and around a wellbore 104 that penetrates a subterranean formation 106. While the wellbore 104 is shown extending generally vertically into the subterranean formation 106, the principles described herein are also applicable to wellbores that extend at an angle through the subterranean formation 106, such as horizontal and slanted wellbores. The wellbore 104 may be drilled into the subterranean formation 106 using any suitable drilling technique. In an embodiment, the drilling rig 100 comprises a derrick 108 with a rig floor 110 through which a work string 112 extends downward from the drilling rig 100 into the wellbore 104. Work string 112 may be any such string, casing, or tubular through which a fluid may flow. While not shown, the work string 112 may a deliver a wellbore servicing apparatus (e.g., a drill bit) or some part thereof to a predetermined depth within the wellbore 104. In some embodiments, at least a portion of the wellbore 104 may be lined with a casing 114 that may be secured into position in the wellbore 104 using cement 116. In alternative embodiments, the wellbore 104 may be partially cased and cemented thereby resulting in a portion of the wellbore 104 being openhole.

During any one or more wellbore drilling, completion, or servicing operations, a lost circulation zone 118 may be encountered. Where the lost circulation zone 118 is encountered, it may be desirable to employ the treatment fluids disclosed herein to prevent, lessen, minimize, and/or cease the loss of fluids to the lost circulation zone 118. Placement of a treatment fluid into the lost circulation zone 118 may be an effective means of bridging or sealing off the lost circulation zone 118 and thereby preventing, ceasing, and/or substantially lessening the loss of fluids from the wellbore 104 to the lost circulation zone 118. While the lost circulation zone 118 is shown as an opening that extends from the wellbore 104 into the subterranean formation 106, it is contemplated that the lost circulation zone 118 may contain one or more features including, without limitation, fractures (natural or pre-existing), cracks, vugs, channels, openings, and/or the like. Moreover, while the lost circulation zone 118 is illustrated in an openhole section of the wellbore 104, it is contemplated that a lost circulation zone may also occur in a section of the wellbore 104 with the casing 114.

As discussed, lost circulation zone 118 may be bridged with the treatment fluids described herein. The lost circulation materials, for example the brown mud, may be provided in a weighted or unweighted "pill" as represented by arrow 120 for introduction into the wellbore. Such pills typically comprise brown mud blended with a small amount of base fluid. The amount of the lost circulation materials used in the pill will depend on the size of the lost circulation zone 118 to be treated. Multiple pills or treatments may be used if needed. Drilling may be stopped while the pill is introduced into and circulated in the wellbore 104. As illustrated in FIG. 1, the pill, as represented by arrow 120, may be pumped into wellbore 104 via work string 112, which exits below lost circulation zone 118. The pill 120 may be pumped up the wellbore annulus where it may enter lost circulation zone 118. Once spotted into place, the pill 120 may prevent or retard the entry of drilling or other wellbore fluids. Pressure may be used to squeeze the pill into the lost circulation zone 118. Alternatively, the brown mud may be added to the drilling fluid and circulated with the drilling fluid during drilling or servicing of the well.

Figure 3:
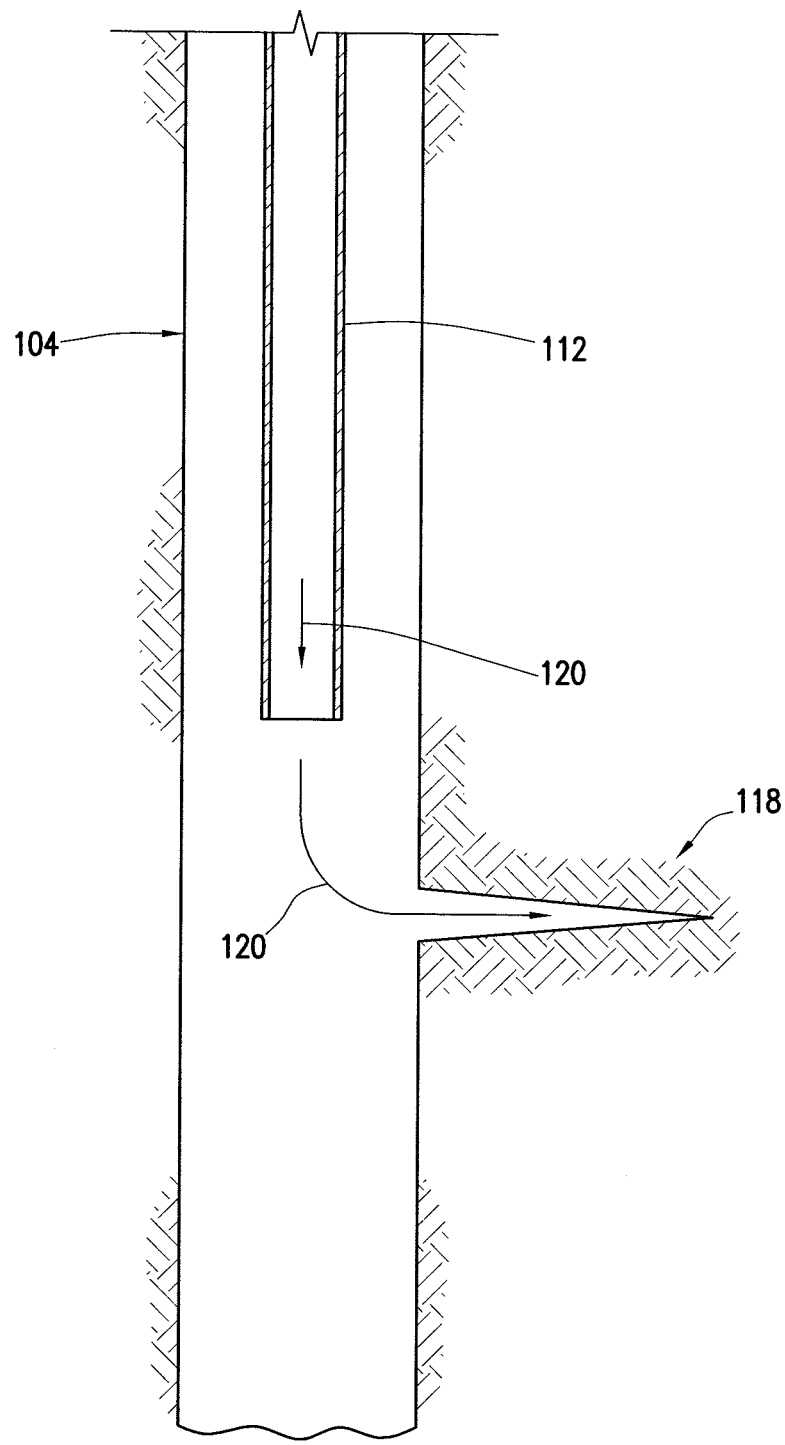
FIG. 3 illustrates another embodiment of the introduction of a treatment fluid into a lost circulation zone within a wellbore penetrating a subterranean formation.

Turning now to FIG. 3, the treatment fluids may be placed in the lost circulation zone 118 by work string 112, which for this example, exits above lost circulation zone 118. Optionally a plug, not shown, may be placed below the lost circulation zone 118. The pill, represented by arrow 120, may be pumped into a portion of the wellbore 114 near, proximate to, or within the lost circulation zone 118. At least a portion of the pill 120 may enter into the lost circulation zone 118 to prevent, cease, and/or substantially lessen the loss of fluids from the wellbore 104 to the lost circulation zone 118. In some alternative examples, the pill 120 may be pumped through a drill bit, not shown, however care should be used with this process so that the pill 120 does not block openings in the drill bit.

Figure 4:
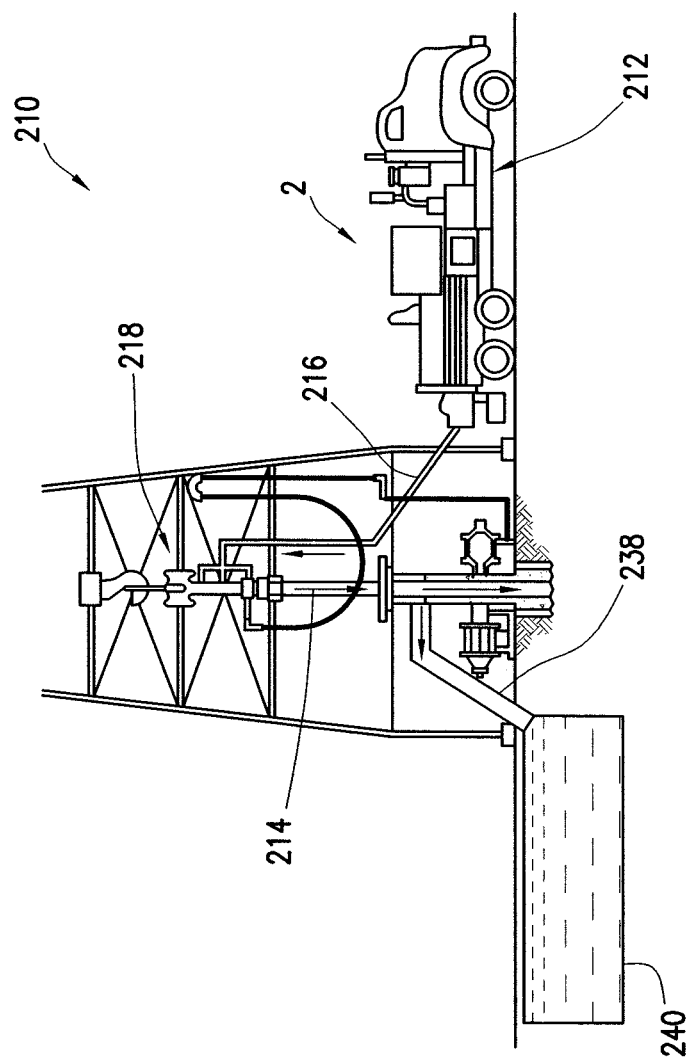
FIG. 4 illustrates surface equipment used for the introduction of a cement composition into a wellbore penetrating a subterranean formation.

An example technique for placing a cement composition comprising brown mud into a subterranean formation will now be described with reference to FIGS. 4 and 5. FIG. 4 illustrates surface equipment 210 that may be used in placement of a cement composition in accordance with certain embodiments. It should be noted that while FIG. 4 generally depicts a land-based operation, those skilled in the art will readily recognize that the principles described herein are equally applicable to subsea operations that employ floating or sea-based platforms and rigs, without departing from the scope of the disclosure. As illustrated by FIG. 4, the surface equipment 210 may include a cementing unit 212, which may include one or more cement trucks. The cementing unit 212 may include the vessel 4 and the pumping equipment 6 shown in FIG. 1 which is represented by fluid handling system 2 on the cementing unit 212, as will be apparent to those of ordinary skill in the art. The cementing unit 212 may pump a cement composition 214 through a feed pipe 216 and to a cementing head 218 which conveys the cement composition 214 downhole. As cement composition 214 is conveyed downhole, the brown mud present in cement composition 214 may bridge any fractures which contact the brown mud. The bridging of such fractures may prevent the escape of the base fluid of the cement composition 214 into the surrounding subterranean formation 220.

Figure 5:
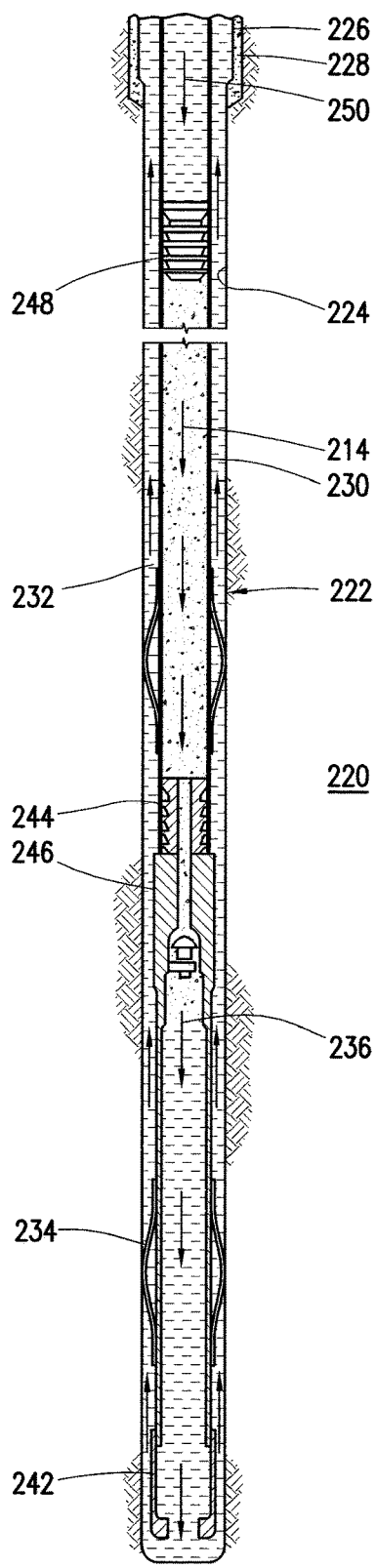
FIG. 5 illustrates an embodiment of the introduction of a cement composition into a wellbore penetrating a subterranean formation.

Turning now to FIG. 5, placing the cement composition 214 into a subterranean formation 220 will now be described. As illustrated, a wellbore 222 may be drilled into the subterranean formation 220. While wellbore 222 is shown extending generally vertically into the subterranean formation 220, the principles described herein are also applicable to wellbores that extend at an angle through the subterranean formation 220, such as horizontal and slanted wellbores. As illustrated, the wellbore 222 comprises walls 224. In the illustrated embodiment, a surface casing 226 has been inserted into the wellbore 222. The surface casing 226 may be cemented to the walls 224 of the wellbore 222 by cement sheath 228. In the illustrated embodiment, one or more additional conduits (e.g., intermediate casing, production casing, liners, etc.), shown here as casing 230 may also be disposed in the wellbore 222. As illustrated, there is a wellbore annulus 232 formed between the casing 230 and the walls 224 of the wellbore 222 and/or the surface casing 226. One or more centralizers 234 may be attached to the casing 230, for example, to centralize the casing 230 in the wellbore 222 prior to and during the cementing operation.

With continued reference to FIG. 5, the cement composition 214 may be pumped down the interior of the casing 230. The cement composition 214 may be allowed to flow down the interior of the casing 230 through the casing shoe 242 at the bottom of the casing 230 and up around the casing 230 into the wellbore annulus 232. The cement composition 214 may be allowed to set in the wellbore annulus 232, for example, to form a cement sheath that supports and positions the casing 230 in the wellbore 222. While not illustrated, other techniques may also be utilized for introduction of the cement composition 214. By way of example, reverse circulation techniques may be used that include introducing the cement composition 214 into the subterranean formation 220 by way of the wellbore annulus 232 instead of through the casing 230.

As it is introduced, the cement composition 214 may displace other fluids 236, such as drilling fluids and/or spacer fluids that may be present in the interior of the casing 230 and/or the wellbore annulus 232. At least a portion of the displaced fluids 236 may exit the wellbore annulus 232 via a flow line 238 and be deposited, for example, in one or more retention pits 240 (e.g., a mud pit), as shown on FIG. 4. Referring again to FIG. 5, a bottom plug 244 may be introduced into the wellbore 222 ahead of the cement composition 214, for example, to separate the cement composition 214 from the other fluids 236 that may be inside the casing 230 prior to cementing. After the bottom plug 244 reaches the landing collar 246, a diaphragm or other suitable device should rupture to allow the cement composition 214 through the bottom plug 244. In FIG. 5, the bottom plug 244 is shown on the landing collar 246. In the illustrated embodiment, a top plug 248 may be introduced into the wellbore 222 behind the cement composition 214. The top plug 248 may separate the cement composition 214 from a displacement fluid 250 and also push the cement composition 214 through the bottom plug 244.

Figure 6:
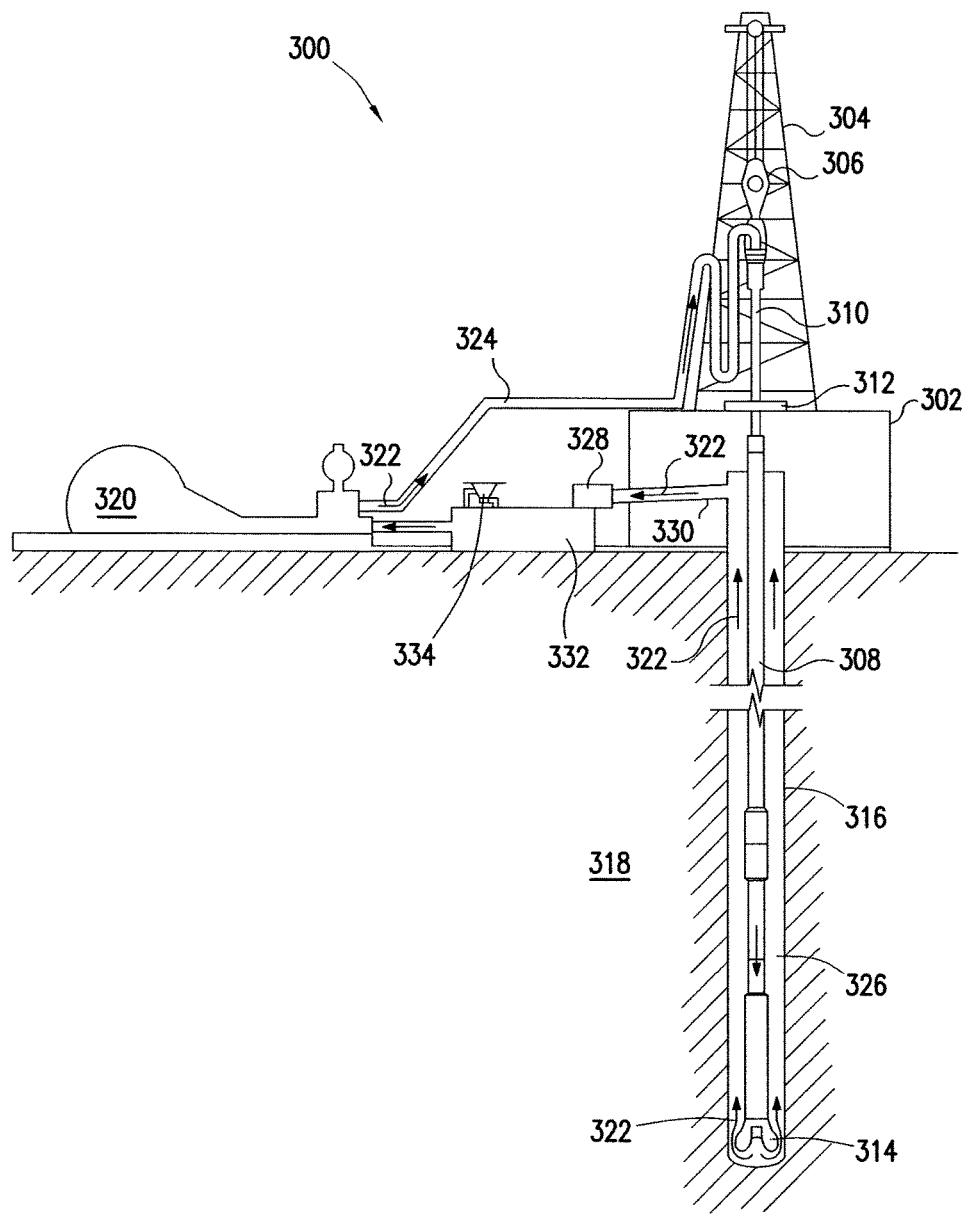
FIG. 6 illustrates an embodiment of the introduction of a drilling fluid into a wellbore penetrating a subterranean formation.

The brown mud treatment fluids disclosed herein may also be used as drilling fluids. The disclosed drilling fluids may be used to aid in the drilling of a wellbore, e.g., by circulating drill cuttings back to the surface via the annulus between the drill string and the walls of the wellbore. With reference to FIG. 6, the disclosed treatment fluids may directly or indirectly affect one or more components or pieces of equipment associated with an example wellbore drilling assembly 300. It should be noted that while FIG. 6 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 300 may include a drilling platform 302 that supports a derrick 304 having a traveling block 306 for raising and lowering a drill string 308. The drill string 308 may include, but is not limited to, conduits such as drill pipe and coiled tubing, as generally known to those skilled in the art. A kelly 310 supports the drill string 308 as it is lowered through a rotary table 312. A drill bit 314 is attached to the distal end of the drill string 308 and is driven either by a downhole motor and/or via rotation of the drill string 308 from the well surface. As the bit 314 rotates, it creates a borehole 116 that penetrates various subterranean formations 318.

A pump 320 (e.g., a mud pump) circulates drilling fluid 322, which may have been stored in a vessel prior to use (such as vessel 4 in FIG. 1), comprising the brown mud disclosed herein, through a feed pipe 324 and to the kelly 310, which conveys the drilling fluid 322 downhole through the interior of the drill string 308 and through one or more orifices in the drill bit 314. The pump 320 may be part of a pumping system. The drilling fluid 322 is then circulated back to the surface via an annulus 326 defined between the drill string 108 and the walls of the borehole 316. As the drilling fluid 322 is pumped back to the surface, the brown mud present in the drilling fluid 322 may bridge any fractures which contact the brown mud. The bridging of such fractures may prevent the escape of the base fluid of the drilling fluid 322 into the surrounding subterranean formations 318.

At the surface, the recirculated or spent drilling fluid 322 exits the annulus 326 and may be conveyed to one or more fluid processing unit(s) 328 via an interconnecting flow line 330. After passing through the fluid processing unit(s) 328, a "cleaned" drilling fluid 322 is deposited into a nearby retention pit 332 (i.e., a mud pit), which may function as a vessel or storage system for the drilling fluid. While illustrated as being arranged at the outlet of the wellbore 316 via the annulus 326, those skilled in the art will readily appreciate that the fluid processing unit(s) 328 may be arranged at any other location in the drilling assembly 300 to facilitate its proper function, without departing from the scope of the scope of the disclosure. In optional examples, at least a portion of the drilling fluid 322 may be recovered and used as or in another treatment fluid, for example, as a displacement fluid, spotting fluid, a cement, or the like.

The drilling fluid 322 may be added to a mixing hopper 334, a type of vessel (for example vessel 4, described in FIG. 1), communicably coupled to or otherwise in fluid communication with the retention pit 332. The mixing hopper 334 may include, but is not limited to, mixers and related mixing equipment known to those skilled in the art. In alternative embodiments, however, the drilling fluid 322 may not be added to a mixing hopper. In at least one example, there could be more than one retention pit 332, such as multiple retention pits 332 in series. Moreover, the retention pit 332 may be representative of one or more fluid storage facilities and/or units where the disclosed treatment fluids may be stored, reconditioned, and/or regulated until used as a treatment fluid, for example, as a drilling fluid 322.

As mentioned above, the drilling fluid 322 may directly or indirectly affect the components and equipment of the drilling assembly 300. For example, the drilling fluid may directly or indirectly affect the fluid processing unit(s) 328 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 328 may further include one or more sensors, gauges, pumps, compressors, and the like used store, monitor, regulate, and/or recondition the treatment fluids.

The disclosed drilling fluids may directly or indirectly affect the pump 320 and any pumping systems (for pumping equipment 6, described in FIG. 1), which representatively includes any conduits, pipelines, trucks, tubulars, and/or pipes which may be coupled to the pump and/or any pumping systems and may be used to fluidically convey the drilling fluid downhole, any pumps, compressors, or motors (e.g., topside or downhole) used to drive the drilling fluid into motion, any valves or related joints used to regulate the pressure or flow rate of the drilling fluid, and any sensors (i.e., pressure, temperature, flow rate, etc.), gauges, and/or combinations thereof, and the like. The disclosed drilling fluids may also directly or indirectly affect the mixing hopper 334 and the retention pit 332 and their assorted variations.

The disclosed drilling fluids may also directly or indirectly affect the various downhole equipment and tools that may come into contact with the drilling fluids such as, but not limited to, the drill string 308, any floats, drill collars, mud motors, downhole motors and/or pumps associated with the drill string 308, and any MWD/LWD tools and related telemetry equipment, sensors or distributed sensors associated with the drill string 308. The disclosed drilling fluids may also directly or indirectly affect any downhole heat exchangers, valves and corresponding actuation devices, tool seals, packers and other wellbore isolation devices or components, and the like associated with the wellbore 316. The drilling fluids may also directly or indirectly affect the drill bit 314, which may include, but is not limited to, roller cone bits, PDC bits, natural diamond bits, any hole openers, reamers, coring bits, etc.

While not specifically illustrated herein, the drilling fluids may also directly or indirectly affect any transport or delivery equipment used to convey the drilling fluids to the drilling assembly 300 such as, for example, any transport vessels, conduits, pipelines, trucks, tubulars, and/or pipes used to fluidically move the drilling fluids from one location to another, any pumps, compressors, or motors used to drive the drilling fluids into motion, any valves or related joints used to regulate the pressure or flow rate of the drilling fluids, and any sensors (i.e., pressure and temperature), gauges, and/or combinations thereof, and the like.

The exemplary treatment fluids disclosed herein may directly or indirectly affect one or more components or pieces of equipment associated with the preparation, delivery, recapture, recycling, reuse, and/or disposal of the disclosed treatment fluids. For example, the disclosed treatment fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of the treatment fluids, and any sensors (i.e., pressure and temperature), gauges, and/or combinations thereof, and the like. The disclosed treatment fluids may also directly or indirectly affect the various downhole equipment and tools that may come into contact with the treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present disclosure, the following examples of some specific embodiments are given. In no way should the following examples be read to limit, or to define, the scope of the invention.

Example 1

X-Ray diffraction was performed on a sample of brown mud to obtain the mineral composition. Table 1 lists the mineral types and their corresponding concentrations in a representative sample of brown mud.

TABLE 1

| Mineral | Empirical Formula | Concentration |
| --- | --- | --- |
| Calcite | $CaCO_3$ | 55% |
| Quartz | $SiO_2$ | 2% |
| Katoite | $Ca_3Al_2(SiO_4)_{3-x}(OH)_{4x}$ x = 1.5-3 | 35% |
| Kaolinite | $Al_2Si_2O_5(OH)_4$ | 7% |
| Perovskite | $CaTiO_3$ | 4% |

As discussed above, brown mud has very little quartz and is mostly comprised of calcite and katoite. These properties distinguish brown mud from other waste products obtained from bauxite refining (e.g., red mud). Without being limited by theory, it is believed the large amount of katoite is responsible for brown muds high thermal resistance. This high thermal resistance makes brown mud suitable for high-pressure, high-temperature wellbore operations.

Example 2

Figure 7:
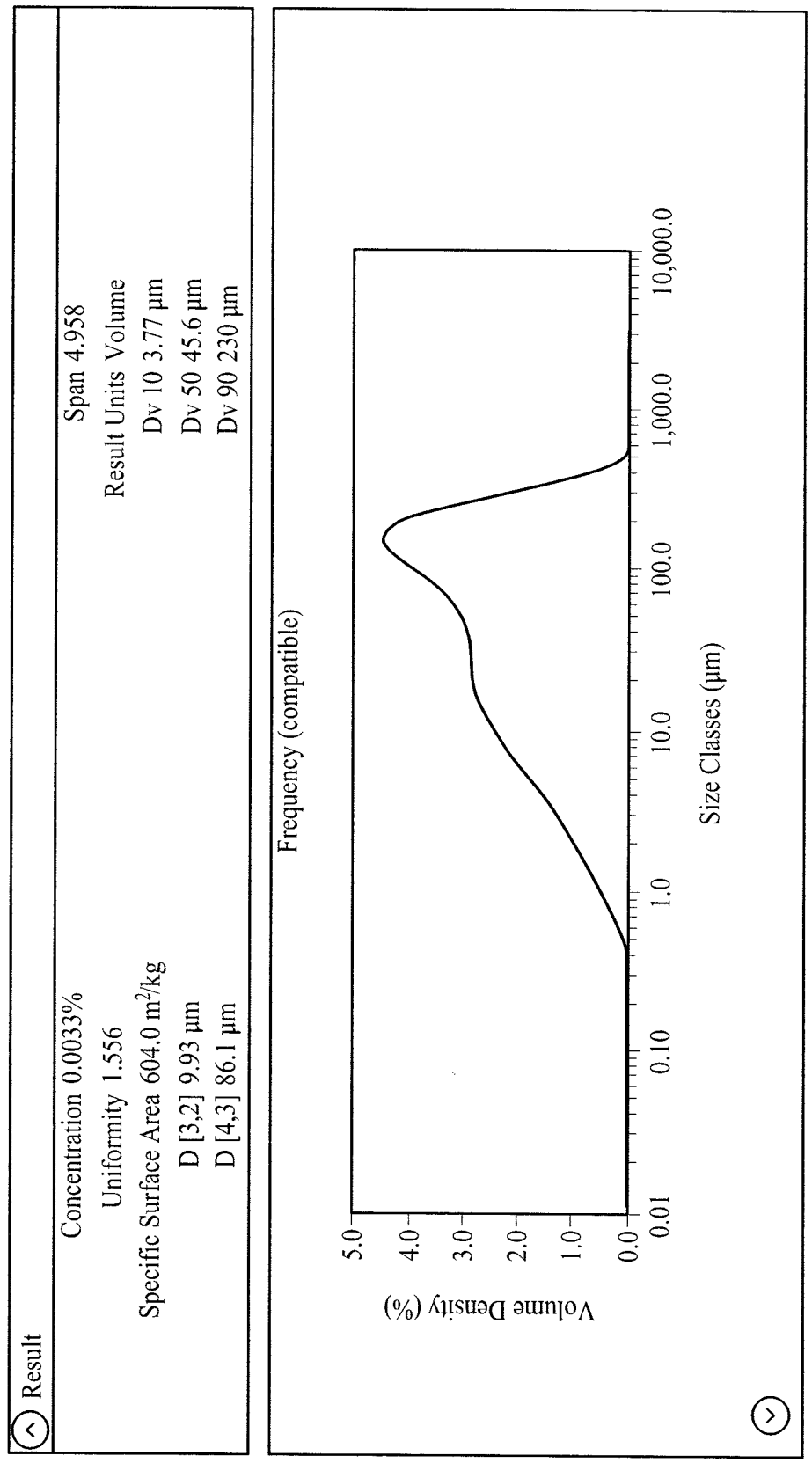
FIG. 7 illustrates the particle size distribution for a sample of brown mud.

Particle size analysis was performed on a sample of brown mud to obtain the particle size distribution in the sample. The particle size distribution is illustrated as FIG. 7. The particle size analysis illustrates the wide distribution of particle sizes in the brown mud sample. The median particle size in the sample was 45.6 μm. 10% of the sample contained material with a particle diameters less than 2.8 μm. 10% of the sample also contained material with particle diameters greater than 233 μm. This wide range of particle sizes allows the brown mud to bridge bigger, wider lost circulation zones as well as small lost circulation fractures. The synergistic effect from the different sized particles provides optimal plugging, bridging, etc. and makes the brown mud ideally suited for use as a lost circulation material.

Example 3

A "flow loop" test was conducted to determine the lost circulation potential of the brown mud. The flow loop test generally comprises adding the brown mud to a treatment fluid and then pumping the treatment fluid through a flow loop. Specifically, the treatment fluid is pumped through a hollow, tubular loop fitted with a slot of a specified width and/or gap in a wall of the tubular. As used herein, the "sealing time" is the time it takes for the treatment fluid to stop flowing through the slot. When the treatment fluid stops flowing through the slot, the pressure on the slot is gradually increased. It is to be understood, that the capability of the instrument may not exceed a pressure of 100 psi (0.7 MPa). Moreover, even though an instrument may be capable of placing a pressure of greater than 100 psi (0.7 MPa) on the seal, the results may not be reliable. Therefore, the specified pressure is meant to take into account the capabilities of the instrument as well as the reliability of the results. After the slot was plugged, the back pressure applied to the brown mud plugging the slot was increased to determine the ability of the brown mud to withstand pressure. To increase the back pressure, the pressure applied by the pump was steadily increased while observing the slot until the brown mud failed, indicated by resumed loss of the treatment fluid through the slot. As long as the seal does not break, the pressure is then held at that pressure for a total of 15 seconds(s). As used herein, the "maximum back pressure" is the pressure at which the seal is maintained and does not allow fluid to flow through the slot for a time period of at least 15 seconds. As a result, the maximum back pressure is the maximum pressure at which the seal does not break within the confines of the testing instrument's limits. The back pressure test withstood by the brown mud is listed below in Table 2.

Table 2 contains flow loop testing data for two slot sizes for a treatment fluid comprising brown mud. The treatment fluid was a cement comprising water at a concentration of 5.56 gal/sack of cement and Texas Lehigh Class H Portland cement. Brown mud was added at a concentration of 6 lbs./sack of cement. The cement sack size was 94 lbs. Two slot sizes were measured; the slot has a width of 30 millimeters and varies in height according to the testing parameters. The two slots used for the present tests had heights of 1 mm and 2 mm. Additionally, the back pressure as described above was measured as was the filter cake thickness of the filter cake formed by the brown mud. The results are illustrated in Table 2 below.

TABLE 2

| Slot Height (mm) | Time Until Flow Stopped (sec.) | Maximum Back Pressure (psi) | Filter Cake Thickness (in.) |
|---|---|---|---|
| 1 | 3 | 60 | 0.375 |
| 2 | DNS* | NA** | NA |

DNS = Flow did not stop after 3 minutes of testing
NA = Not applicable

This result indicates that brown mud may be used as an effective lost-circulation material in a treatment fluid.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

It should be understood that the compositions and methods are described in terms of "comprising," "containing," or "including" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention.

What is claimed is:

1. A method for reducing lost circulation in a subterranean formation, the method comprising:
    providing a treatment fluid comprising a base fluid and a lost circulation material comprising brown mud wherein the brown mud is derived from bauxite ore sintering in the presence of sodium carbonate; and
    introducing the treatment fluid into a wellbore within the subterranean formation such that at least a portion of the brown mud bridges openings in the subterranean formation to reduce loss of fluid circulation into the subterranean formation.

2. A method according to claim 1 wherein the brown mud comprises at least 50% calcite and at least 30% katoite.

3. A method according to claim 1 wherein the brown mud has a median particle size between about 20 μm and about 100 μm.

4. A method according to claim 1 wherein the brown mud comprises particles with a particle diameter of less than 3 μm.

5. A method according to claim 1 wherein the treatment fluid comprises a drilling fluid, a spacer fluid, a spotting fluid, a packer fluid, a cement composition, a completion fluid, or a fracturing fluid.

6. A method according to claim 1 wherein the treatment fluid comprises a drilling fluid, and wherein the drilling fluid circulates drill cuttings out of the wellbore.

7. A method according to claim 1 wherein the treatment fluid comprises a cement composition, and wherein the cement composition is allowed to set in the wellbore.

8. A method according to claim 1 wherein the brown mud is placed into a lost circulation zone disposed within the subterranean formation.

9. A treatment fluid comprising:
    a lost circulation material comprising brown mud wherein the brown mud is derived from bauxite ore sintering in the presence of sodium carbonate, and
    a base fluid.

10. A treatment fluid according to claim 9 wherein the brown mud comprises at least 50% calcite and at least 30% katoite.

11. A treatment fluid according to claim 9 wherein the brown mud has a median particle size between about 20 μm and about 100 μm.

12. A treatment fluid according to claim 9 wherein the brown mud comprises particles with a particle diameter of less than 3 μm.

13. A treatment fluid according to claim 9 wherein the treatment fluid comprises a drilling fluid, a spacer fluid, a spotting fluid, a packer fluid, a cement composition, a completion fluid, or a fracturing fluid.

14. A treatment fluid according to claim 9 wherein the base fluid is an aqueous fluid.

15. A treatment fluid according to claim 9 wherein the base fluid is selected from the group consisting of petroleum oil, natural oil, synthetically derived oil, mineral oil, silicone oil, kerosene oil, diesel oil, an alpha olefin, an internal olefin, an ester, a diester of carbonic acid, a paraffin, and combinations thereof.

16. A system for bridging a lost circulation zone comprising:
- a treatment fluid comprising a lost circulation material comprising brown mud and a base fluid wherein the brown mud is derived from bauxite ore sintering in the presence of sodium carbonate;
- a fluid handling system comprising the treatment fluid; and
- a conduit at least partially disposed within a wellbore and fluidically coupled to the fluid handling system.

17. A system according to claim 16 wherein the treatment fluid comprises a drilling fluid, a spacer fluid, a spotting fluid, a packer fluid, a cement composition, a completion fluid, or a fracturing fluid.

* * * * *